United States Patent [19]
Hammons, Jr.

[11] Patent Number: 5,832,031
[45] Date of Patent: Nov. 3, 1998

[54] METHOD AND APPARATUS FOR PERFORMING CYCLIC REDUNDANCY CHECK SYNCHRONIZATION

[75] Inventor: A. Roger Hammons, Jr., N. Potomac, Md.

[73] Assignee: Hughes Electronics Corporation, El Segundo, Calif.

[21] Appl. No.: 516,584

[22] Filed: Aug. 18, 1995

[51] Int. Cl.$^6$ ............................... H04L 5/12; H04L 23/02
[52] U.S. Cl. ..................... 375/262; 375/341; 375/354; 371/37.7; 371/42
[58] Field of Search ................... 375/262, 265, 375/341, 342, 354; 371/37.7, 39.1, 42

[56] References Cited

U.S. PATENT DOCUMENTS

| | | | |
|---|---|---|---|
| 4,306,305 | 12/1981 | Doi et al. ............................... | 371/37.7 |
| 4,541,095 | 9/1985 | Vries ..................................... | 371/37.12 |
| 5,084,891 | 1/1992 | Ariyavisitakul et al. ................. | 371/42 |

OTHER PUBLICATIONS

Lin et al, "ERROR CONTROL CODING: Fundamentals and Application", Prentice Hall, pp. 85–121, 1983.

*Primary Examiner*—Don N. Vo
*Attorney, Agent, or Firm*—Michael Sales; John T. Whelan

[57] ABSTRACT

A method and apparatus for synchronizing and error checking received bitstreams of encoded information is provided. The apparatus includes a single polynomial division shift register. The method involves calculating successive syndromes using the single polynomial division shift register by shifting the received bits of information, generating a syndrome, and comparing the syndrome to a known marker syndrome.

10 Claims, 8 Drawing Sheets

METHOD AND APPARATUS FOR PERFORMING CYCLIC REDUNDANCY CHECK SYNCHRONIZATION

BACKGROUND OF THE INVENTION

This invention relates to synchronization and error checking of received information signals. More particularly, this invention relates to an improved method and apparatus for synchronizing received data using a cyclic redundancy check (CRC) based technique.

For mobile radio systems using a time-division multiple access (TDMA) format, symbol timing synchronization is usually achieved by correlating the received signal against a known preamble transmitted along with the information bits within a particular TDMA timeslot. Other synchronization techniques are used in recently developed standards for providing wireless access communications systems (WACS) and personal access communications systems (PACS) in personal communications services (PCS) environments. Further details concerning the proposed WACS standard are set out in Bellcore Corp. publication TR-INS-001313 entitled Generic Criteria for Version 0.1 Wireless Access Communications Systems (WACS) published October 1993 (herein referred to as "the Bellcore specification"). The publication is available to those interested in WACS PCS from Bellcore Corp. at Bellcore, Customer Services, 8 Corporate Place—Room 3C-183, Piscataway, N.J. 08854-4156, or at 1 (800) 521-CORP. Additionally, the U.S. Telecommunications Industry Association (TIA) has recently approved a PACS standard as set forth in TIA publication JTC(AIR)/95.4.20-033R2. The reader is presumed to be familiar with both standards and with related technological issues known to those having ordinary skill in the art.

In low overhead TDMA systems, such as the proposed PACS standard for PCS, no preamble is transmitted in front of information sent in a transmission. Instead, a coset code is used to aid in synchronization. In this scheme, the information bits to be transmitted are encoded using a systematic, high rate cyclic code. Prior to transmission, certain bits of the codeword are inverted to provide a marker that the receiver may exploit for synchronization.

In one known synchronization technique for PACS, the receiver (1) reinverts the presumed leading and trailing bits of the received bit stream, (2) cyclically shifts the potentially errored bits into the parity region of the codeword, and (3) computes the cyclic redundancy check (CRC) for this shifted vector. In the absence of channel errors, this syndrome is of known form from which the amount of bit slippage can be determined. Steps (1) and (2) of this technique introduce certain disadvantages. First, a second CRC is required once the bit slippage is corrected in order to check for word error, resulting in additional processing delay. Second, the technique is compatible only with full-length cyclic codes, significantly limiting the system designer's choice of error-detection code. Accordingly, a new method of synchronizing and error checking information in a received bit stream is necessary that reduces processing delay and can operate using shortened cyclic codes.

SUMMARY OF THE INVENTION

The present invention provides an improved method and apparatus for synchronizing and error checking cyclically coded information transmitted in a wireless communications system. According to a first aspect of the invention, a method is provided that begins by selecting a predetermined number of bits of information received from a transmitted signal. A syndrome value, indicative of both bit synchronization and bit error, is then generated from a portion of the received bits. The syndrome is compared to a marker syndrome and, if the bits of information are synchronized and error free, the generated and marker syndromes match. In a preferred embodiment, the predetermined number of received bits are rotated or shifted, a new syndrome is generated, and the generated and marker syndromes are compared until the syndromes match or until the received bits have been rotated a predetermined number of times.

According to a second aspect of this invention, an apparatus for determining synchronization and errors in a received demodulated bit stream of information includes a first shift register for storing and shifting a predetermined number of bits from the received demodulated bitstream. A first switch is connected to the shift register and to syndrome correction lines. A second shift register for storing generated syndromes communicates with the first shift register via the syndrome correction lines and first switch. A second switch is connected to the second shift register and a comparator communicates with the second shift register via the second switch. A timing and control block communicates with the comparator and controls the operation of both of the switches.

DETAILED DESCRIPTION OF THE DRAWINGS

As background for the present invention, reference is made to FIGS. 7–10 to illustrate one wireless personal communication services environment in which the method and apparatus of the present invention may operate. A typical architecture for a wireless PCS system includes subscriber units (SUs), radio ports (RPs), one or more radio port controllers (RPCs), and an access manager (AM). The SUs transmit information to the RPS using radio frequencies. RPs are small devices typically mounted to existing utility poles. The RPs are connected to an RPC using wireline facilities. Each RPC is connected to a switch that is part of the public switched telephone network (PSTN) and the AM. The AM provides overall coordination of the call handoff across RPCS, has the function of mobility management, and supports subscriber related features such as registration and authentication.

Figure 7:
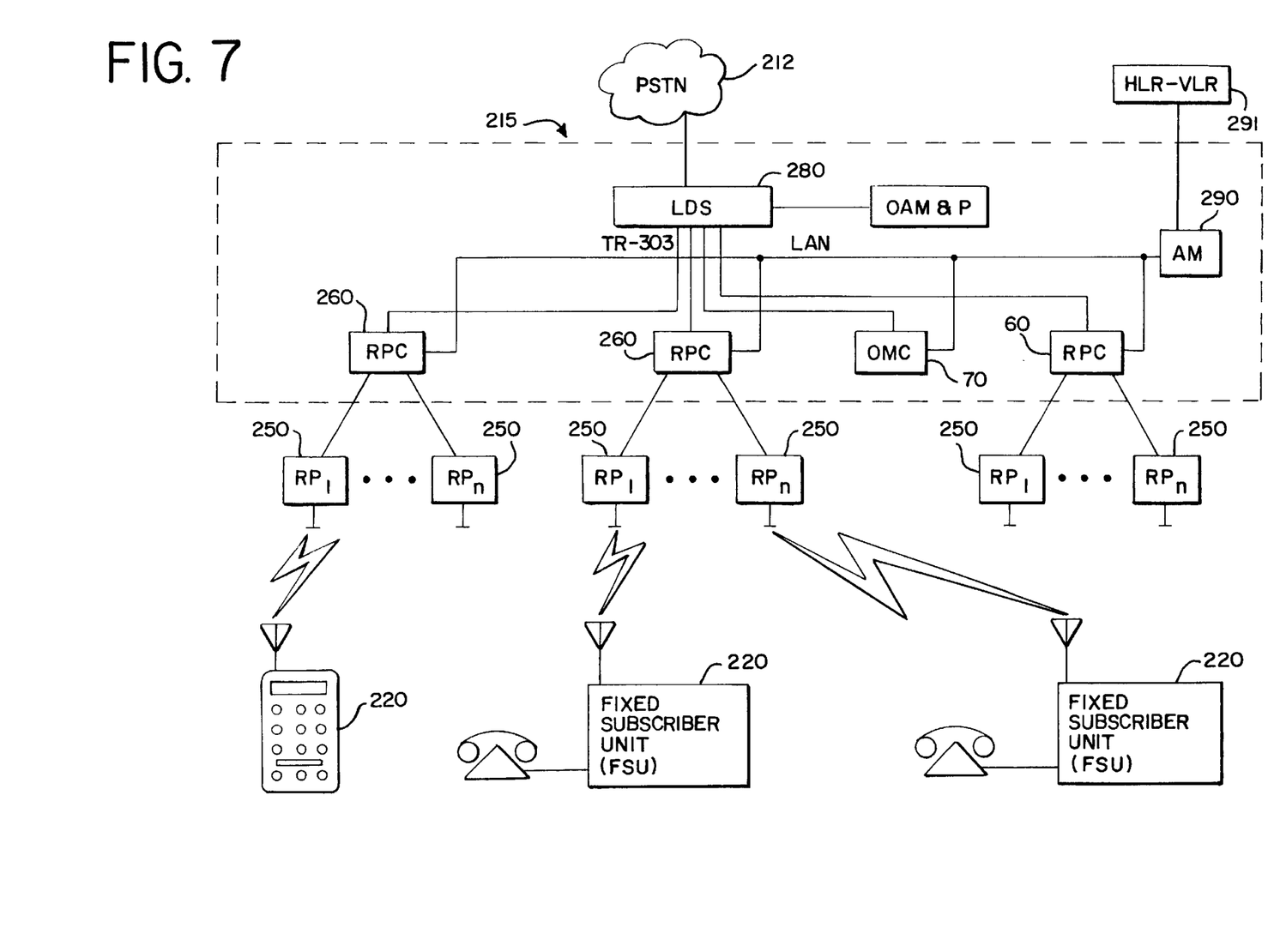
FIG. 7 is a wireless personal communications system that may incorporate the method and apparatus of the present invention.

FIG. 7 illustrates a general block diagram of a wireless personal communication system 215 that may be used for WACS or PACS. The system 215 includes subscriber units (SU) 220, radio ports (RP) 250, radio port control units (RPC) 260, an operations maintenance center (OMC) 270, a local digital switch (LDS) 280, and an access manager (AM) 290. The SU 220 communicates with the radio port 250 via radio links. Each RP 250 communicates with an RPC 260 via transmission lines, typically standard T1 lines. The RPC 260 controls radio links and transmission lines carrying various voice and data communications. The switch 280 controls access between one or more wireless systems 215 and the public switch telephone network (PSTN) 212. The AM 90 provides call control, communicates with the switch 280 to provide voice paths between the WACS/PACS network and the PSTN, and connects to a home location register-visitor location register (HLR-VLR) 291. Additional details are known to those skilled in the art and are set forth in the Bellcore specification.

In the system 215 shown in FIG. 7, the method and apparatus of the present invention are primarily operative in the RPs 250 and SUs 220. In WACS/PACS PCS, the radio port (RP) 250 performs the basic function of transmitting and receiving voice and data information between the SU 220 and the RPC 260. The RP 250 exchanges information with one or more SUs 220 over a radio link at RF frequencies in the range of 1.8 to 2.2 GHz. The RP 250 may exchange information with a single RPC 260 over a standard T1 transmission line. In addition, one or more RPs 250 may communicate with the RPC 260 over a DS1 interface, a high bit-rate digital subscriber loop (HDSL) interface, or a T1 interface. In WACS/PACS standards, SUs, whether portable or fixed, receive analog voice signals such as those spoken into a telephone handset. The SUs typically convert the analog voice signal to a digital signal and compress the digital signal. The SU then transmits the compressed signal over a radio link to an RP. The RP forwards the signal to an RPC over wireline facility. Signals transmitted from an RP are received by the SU, decompressed and converted to an analog signal to drive e.g. an earpiece.

Figure 8:
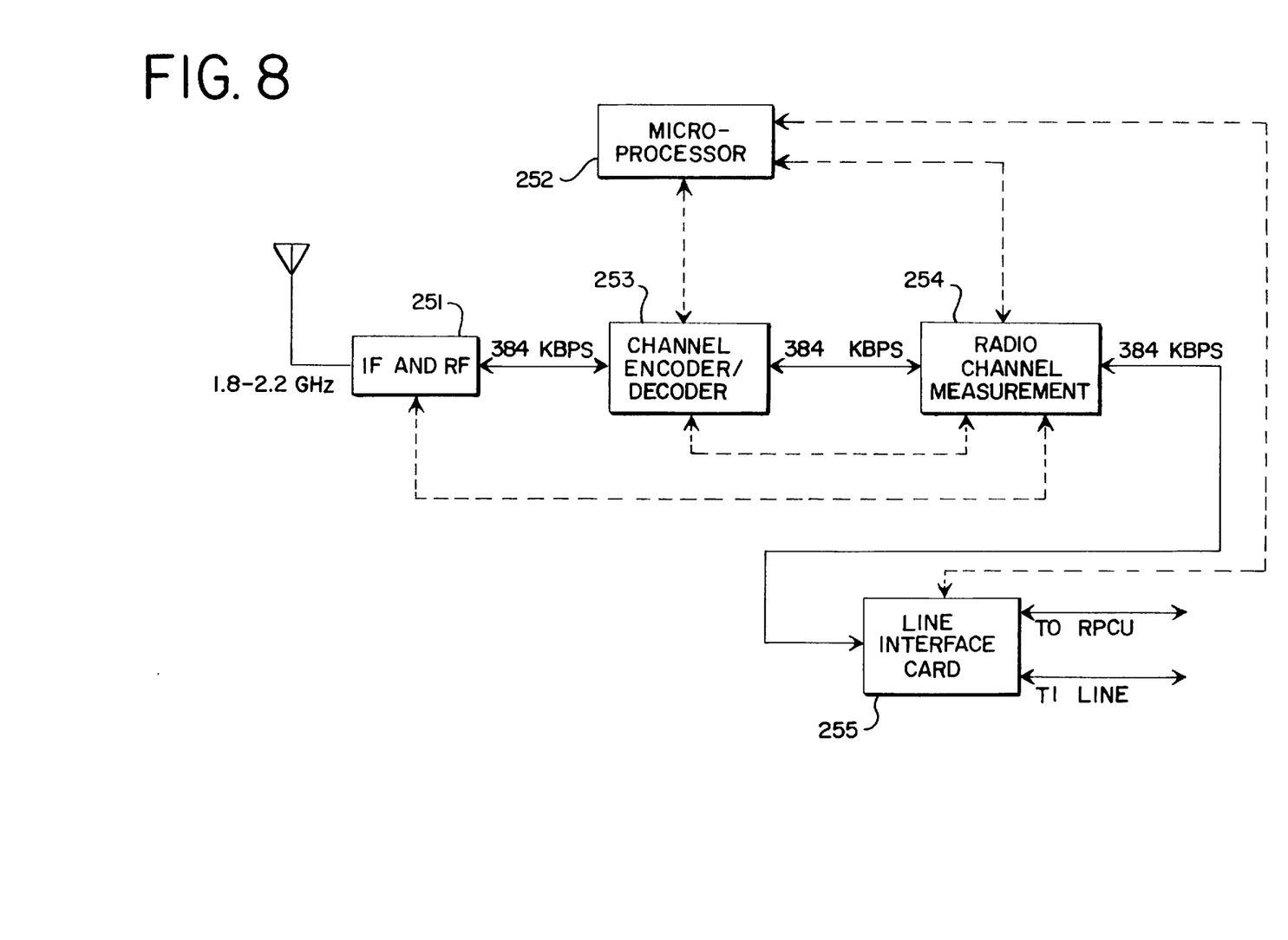
FIG. 8 is a block diagram of a radio port (RP) as shown in FIG. 7.

FIG. 8 best shows a functional block diagram of a basic RP 250. The RP 250 generally performs several functions including: transmission/reception of the radio frequency signals, channel coding/decoding of signals for synchronization with the network, and general performance measurements. The RP 250 contains an IF and RF section 251 receiving and transmitting information signals at RF frequencies over an antenna or antennas. Received RF signals at the IF and RF section 251 are downconverted to a 384 kilobits per second (kbps) data stream and sent to the channel encoder/decoder 253 function block. Although the 384 kbps data rate used in PACS is shown, other data rates are equally suitable, such as 400 kbps which is used in WACS applications. The channel encoder/decoder 253 function is controlled by a microprocessor 252. The channel encoder/decoder 253 function involves managing the timing of signals arriving and leaving the RP 250. The microprocessor function 252 also manages the channel encoder/decoder 253 such that information received from an RPC is encoded into 32 kbps ADPCM for transmission to an SU 220.

The standard RP 250 also performs radio channel measurements measuring the performance of SUs 220 and the RP 250. Controlled by the microprocessor 252, the radio channel measurement 254 is made and information is sent to the RPC for processing with each burst. Voice and data signals broadcast over a radio link at RF frequencies are received at the RP 250. The RF frequencies are downconverted from the RF frequencies to a 384 kbps data stream in order to recover the information in the signal. The 384 kbps data stream is decoded, processed through a radio channel measurement unit 254 and then sent through a line interface card 255 for transmission over a T1 line connected to an RPC. The decoded information received from an SU 220 and sent on to the T1 line is in a 64 kbps PCM format. Conversely, signals received from the RPC are processed first through a line interface card 255 controlled by a microprocessor 252 and then encoded and converted to RF frequencies for transmission to an SU 220.

Figure 9:
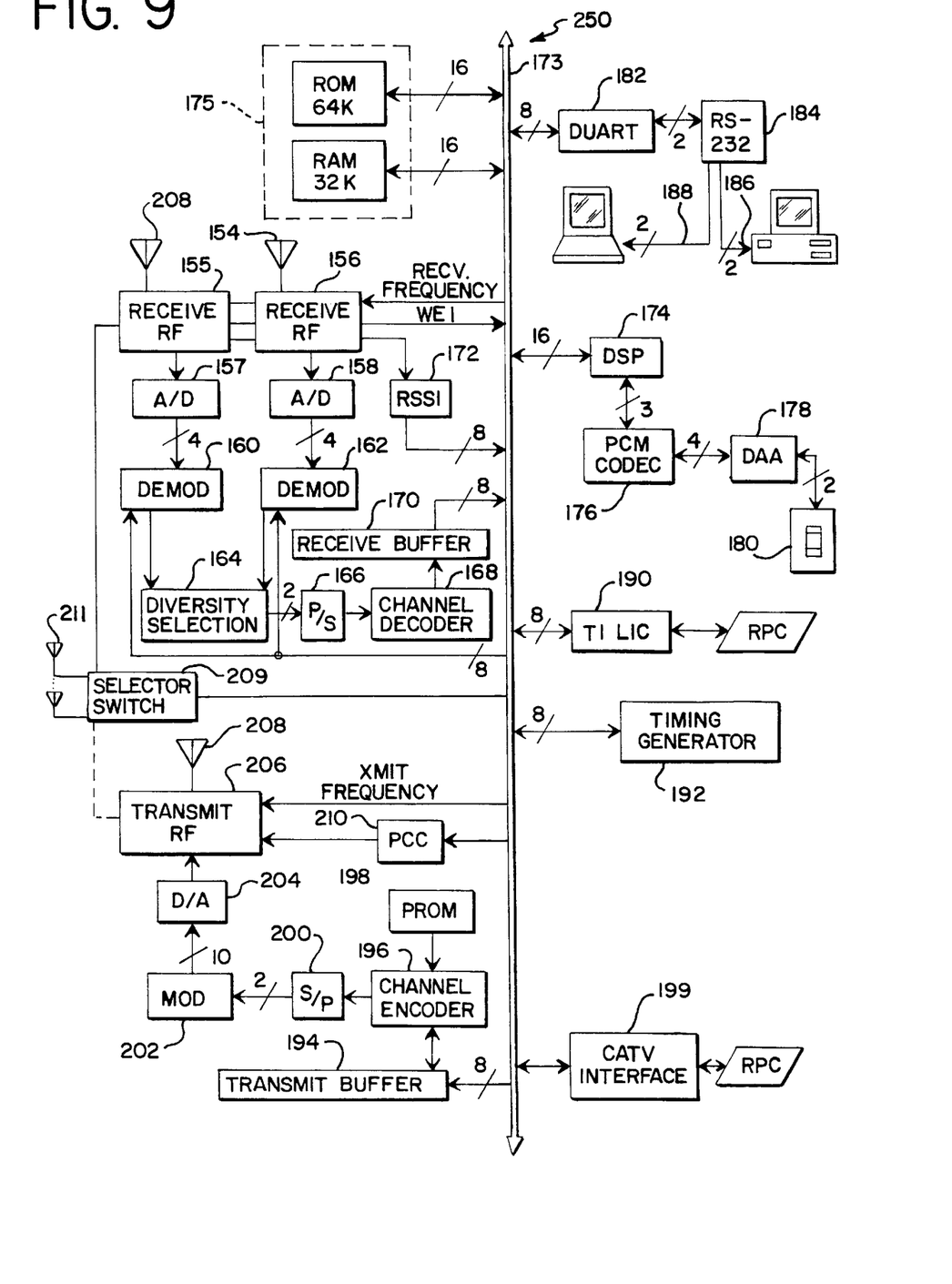
FIG. 9 is a functional block diagram of the RP of FIG. 8.

FIG. 9 illustrates an RP 250 in more detail. The RP 250 receives RF frequency signals from one or more SUs 220 on at least two spatially diverse antennas 152, 154. An antenna selector switch 209 coupled to a plurality of antennas 211 is also included. The antenna switch 209 is connected to the databus 173, the RF receive sections 155, 156 and, optionally to the RF transmit section 206.

The RP 250 is tuned to receive a particular frequency by the digital signal processor 174, such as a TMS320C53. The received signal from the SU 220 is then downconverted in the receive RF sections 155, 156 respectively attached to the spatially diverse antennas 152, 154. Each receive RF section 155, 156 downconverts the same frequency and channels the downconverted signal to an analog-to-digital (A/D) converter 157, 158 respectively attached to the receive RF sections 155, 156. The A/D converters 157, 158 are 8 bit, 20 Megasample per second A/D converters such as a CXD1175AMT6 manufactured by Sony Corporation. The digital signals are transferred to modem demodulators 160, 162, which may be implemented as a Xilinx XC4005 or Xilinx 4013 chip. Once the digital signals have been demodulated in the demodulating sections 160, 162 they are compared in a diversity selector 164. At the diversity selector 164, also implemented with a Xilinx 4005 or Xilinx 4013 chip, the different RF downconverted signals demodulated in the demodulators 160, 162 are compared to find the best signal of the two that have been downconverted.

Following reception and downconversion of the RF frequencies and diversity selection, the signal is processed through a parallel-to-serial (P/S) converter 166 and input in serial format to a channel decoder 168. The channel decoder 168 decodes the correlation information. The channel decoder 168 comprises a Xilinx XC4005-6PQ208C chip. Information decoded in the channel decoder 168 is then forwarded to a receive buffer 170 prior to being sent on a databus 173 to a destination determined by the digital signal processor 174. Voice information is transmitted along the databus 173 to the DSP 174. The DSP 174 decodes the 32 kbps ADPCM to 64 kbps PCM. The PCM Codec 176 receives the 64 kbps mu-law PCM and decodes it into an analog signal. The analog signal is then processed in a Data Access Arrangement (DAA) 178 for transmission along telephone lines.

If the information placed onto the databus 173 is data information, the data information is then directed by the DSP 174 to the appropriate dataports 188, 186. The dataports 188, 186 are connected to the databus 173 via a DUART which translates the information into an asynchronous serial input/output form that is then handed to an RS-232 port 184. Alternatively, if the voice or data information placed on the databus 173 is intended for processing through a WACS/PACS network, then the information may remain in 32 kbps ADPCM and be routed through a T1 transport 190, such as an AT&T 1711SA chip, which interfaces with an RPC 260.

Voice information received from the telephone lines, RPC 260, or CATV transport 199 is transferred along the databus 173 to the transmit buffer 194 in preparation for encoding in a channel encoder 196 which may be implemented in a Xilinx XC4005-6PQ208C chip. The encoder 196 is programmed with the algorithm disclosed in the Bellcore specification in firmware installed in a PROM 198. The RP 250 also has a memory block 175 for extra program storage capability. The channel encoder 196 encodes the received 32 kbps ADPCM signal with information regarding timing and synchronization. The encoded ADPCM signal is processed through a serial-to-parallel (S/P) 200 device to configure the signal for modulation in a modulator 202 which then transfers the signal to a digital-to-analog (D/A) converter 204. After conversion to analog form, the modulated signal is then converted to an RF transmission signal in a transmit RF section 206. The RF signal containing the encoded data is then transferred along the transmit antenna 208 to the appropriate SU 220. For transmission of data where no encoding is necessary the encoder 196 and S/P converter 200 are bypassed and the databus 173 is directly connected to the modulator 202. This decision may be controlled by the digital signal processor (DSP) 174.

Generally, the RP 250 transmits a time division multiplex (TDM) transmission with 8 time slots. The RP 250 uses one of the time slots as a system broadcast channel (SBC) for reference by the SU 220 in synchronizing frames transmitted. The SU 220 uses TDMA protocol so that it transmits into one of the 8 slots in bursts, the RP 250 transmits on all 8 slots in TDM mode. When transmitting, the RP 250 synchronizes with the rest of the system 215 using a timing generator 192 which operates at 400 kHz. The timing aspects of the eight slot message 270 transmitted by the RP 250 is important both because information sent from an SU 220 must be synchronized to fit into the proper slot in a frame and because information transmitted to the RP 250 and then onto T1 lines must be synchronous with time slots available and expected by the system 215. For a more detailed description of one possible RP, reference is made to pending U.S. patent application Ser. No. 08/476,848, filed Jun. 7, 1995.

Figure 10:
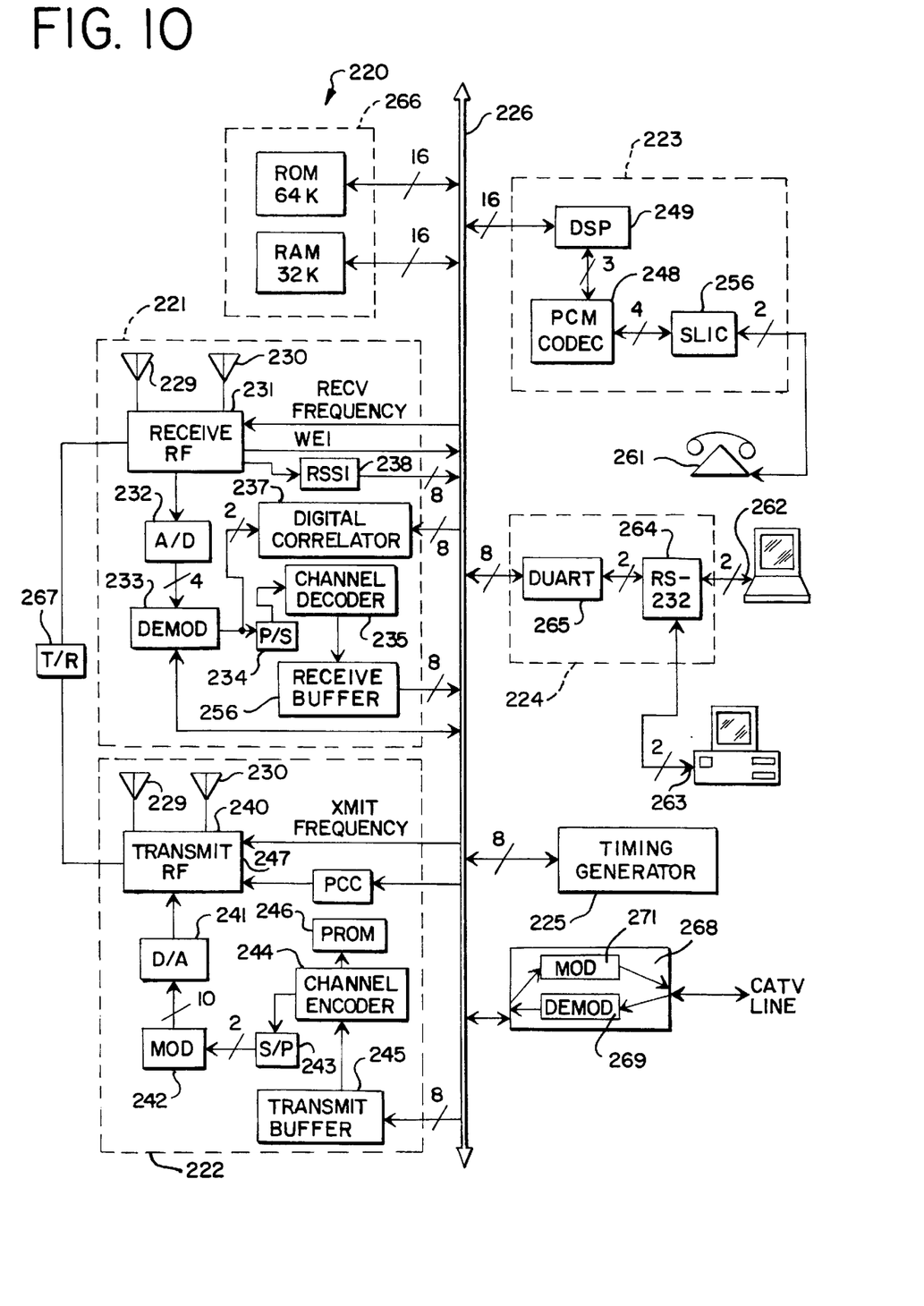
FIG. 10 is a block diagram of a subscriber unit (SU) shown in FIG. 7.

Referring to FIG. 10, one implementation of an SU 220 is shown in greater detail. The SU 220 has five connections to the outside environment: an RF receive antenna 230, an RF transmit antenna 229, a telephone connection 261, a data port 262, and a debug port 263. Internally, the subscriber SU 220 comprises an RF receive section 221, an RF transmit section 222, an analog port 223, a digital dataport 224, a timing generator 225, a memory section 266, and a databus 226 connecting all the internal blocks together. The SU contains a cable transport module 268 connected to the databus 226 for interfacing voice/data signals from the databus to a CATV line. The module 268 contains a modulator 271 and a demodulator 269 for modulating and demodulating signals onto a cable television system.

The RF receive section 221 receives an RF input signal from the antenna 230. In the RF section 221, voice information is extracted from the RF signal in the form of a 32 kilobit per second (kbps) ADPCM signal. Data information may be received in ADPCM or PCM formats. The RF section 221 also demodulates correlation information in the RF input signal.

As shown in FIG. 10, there appear to be two antennas 229, 230 connected to the receive section 221. The SU may also transmit on either antenna. A transmit/receive switch 267 is coupled to both antennas 229, 230 and to the RF receive and transmit sections 221, 222. The antennas 229, 230 are positioned apart from one another to provide spatial diversity and improve reception/transmission quality.

The RF transmit section 222 receives voice or data information from the databus 226 and generates an output signal containing the voice or data information for transmission over at least one antenna. Voice information is compressed to 32 kbps ADPCM and data information is simply modulated onto RF signals for transmission. The SU 220 may also transmit or receive from another SU 220 directly.

The analog port 223 receives analog information such as from an analog telephone and converts it to digital 32 kbps ADPCM for further processing and transmission over a radio link. Voice information arriving from the databus 226 in 32 kbps ADPCM form is converted to an analog signal and is communicated to a telephone connected to the port 223. The digital port 224 manages data signals sent to and from both the debug port 263 and the data port 262. The digital port 224 permits modemless transmission and reception of digital signals at the SU 220. The databus 226 is a data line connecting the various internal functions of the SU 220. The databus 226 is a 16-bit wide communication line.

A standard two wire loop may connect the analog port 223 to a standard analog telephone. Analog voice signals picked up at the handset of the telephone will be converted in a subscriber line interface chip (SLIC) 256 from the two wire signal to a four wire signal. The four wire format voice signals are sampled and coded into a 264 kilobit per second mu-law pulse code modulated (PCM) signal by a PCM codec 248 in the SU 220. The digital signal is then processed in the digital signal processor (DSP) 249 which compresses the PCM signal into a 32 kbps ADPCM signal.

The DSP 249 sends the ADPCM signal along a databus 226 to the RF transmit section 222 where it enters a transmit buffer 245. The digital signal is temporarily stored in the transmit buffer 245 and then is transferred to the channel encoder 244. The channel encoder 244 encodes the digital signal with synchronization information in accordance with instructions stored in a programmable read only memory (PROM) 246 integrated circuit. The program stored in the PROM 246 is the decoding and encoding algorithm disclosed in the Bellcore specification which anyone of ordinary skill in the art may program in to a PROM or other memory device. The encoded digital signal is transported through a serial-to-parallel (S/P) converter 243 to a modulator 242. The encoded signal is then converted from digital to analog in a digital-to-analog (D/A) converter 241 and transmitted from the transmit RF section 240 by an RF antenna 229.

Digital data signals originating at the digital input port 224 follow a different path. Initially, the signal coming in at a digital port 224 passes through an RS-232 connection 264 into a DUART device 265. The data information signal, unlike a voice signal, is not compressed into ADPCM format. The digital data signal is not processed in the PCM codec 248 or DSP 249. Instead, it proceeds along the same databus 226 as the voice signals and goes directly to the transmit buffer 245, the encoder 244 and then to the MOD 242 for modulation onto a carrier frequency.

After modulation, the signal (regardless of whether voice or data) is then converted to an RF signal approximately within the range of 1.8 to 2.2 GHz and transmitted from the RF transmit section 222 at an average power of approximately 10–20 milliwatts. The peak power transmitted is approximately 80–160 milliwatts.

In standard WACS PCS, the output power of the RF transmit section 222 is controlled by a power control channel (PCC). The PCC can control the output power in steps of 0.75 dB +/- 0.25 dB steps, with the total adjustment range being approximately 30 dB. A power controller 242 in the RF transmit section 222 of the SU 220 translates the power control instructions originating from the RPC 260.

Signals received by the SU 220 from a WACS/PACS PCS system first arrive at the RF antennas 229, 230 and are processed through a receive RF unit 231. The received analog signals are converted to digital form in an analog-to-digital (A/D) converter 232 and then demodulated in a demodulator 233. The demodulated wave form is then passed through a parallel-to-serial (P/S) converter 234, decoded in a channel decoder 235, and passed through a receive buffer 236. As part of the demodulation and decoding of the signal, the signal is also passed through a digital correlator 237 to analyze timing synchronization. The decoded signal in the receive buffer 236 then passes on to the databus 226 to the appropriate analog or digital port 223, 224 as determined by the DSP 249. Suitable parts for the A/D and D/A converters 232, 241 are a CXD1175AM-T6 A/D converter and a CXD1171-T6 D/A converter available from Sony Corporation.

The central processing unit managing the processes in the SU 220 is a digital signal processor (DSP) 249. A Texas Instruments TMS320C50 DSP chip is suitable. Other DSP chips, such as a TI TMS320C53 may also be used. The DSP 249 is used for both signal controls and performing the 32 kbps ADPCM speech encoding/decoding. The DSP 249 operates as a 16-bit parallel load processor utilizing a 16-bit wide data bus 226. The DSP 249 is driven by a clock frequency received from the RF transmit 222 and receive 221 sections. The clock frequency is approximately 16 MHz but higher or lower frequencies may be used. The SU 220 may include an application specific integrated circuit (ASIC) for performing the control functions of cyclic redundancy checking, general synchronization of incoming and outgoing signals, digital phase-locked loop. In addition, the compression/decompression of the signals may be completed by the ASIC. The ASIC may replace the channel decoder 235, channel encoder 244, digital correlator 237, and the DUART 265.

Two components in the SU 220 require the attention of the DSP 249. The DUART 265, which handles data flow, and the channel encoder/decoder 244, 235, which may be a single chip such as a Xilinx XC4005-6PQ208C, both generate interrupts to indicate that there is incoming data or that the component is ready for more data. The channel encoder/decoder 244, 235 generates two separate interrupts; one for encoding and one for decoding.

In WACS/PACS PCS, the SU 220 employs a time division multiple access (TDMA) method of communicating digital information to a radio port 250. The formatted information transmitted from the SU 220 to the RP 250 is arranged in eight time slot frames, each time slot comprising 120 bits of information (100 bits in WACS). The SU 220 broadcasts information onto one of the time slots in radio transmission bursts to the RP 250. A particular RF frequency can carry one frame of information.

Each 120 bit burst of information lasts approximately 250 microseconds and is synchronized such that the burst always corresponds with an appropriate time slot that the SU 220 reserved for the particular transmission. Each timeslot of the transmitted message frame carries information necessary to synchronize the SUs 220 transmission burst. Each TDMA burst from an SU 220 contains several information fields: guard band (GRD), slow channel (SC), fast channel (FC), cyclic redundancy check (CRC), and a reserved bit (RES).

The SC field contains call control and other supervisory signalling information. The FC contains the speech or data transmitted from the SU 220 to the RP 250. The CRC information is computed at the SU 220 and used to compare against CRC data computed in the RP 250 for error detection or correction. No information is transmitted during the GRD, which simply serves to separate transmissions from different SUs. The length of the GRD is such that differences in propagation delay from the center to the edge of a cell will not cause different SU transmissions to overlap in time.

An RP 250 transmits voice or data information to an SU in time division multiplex (TDM) format. TDM transmissions are continuous radio transmissions as opposed to the TDMA bursts. Again the SU 220 is allocated to a specific 120 bit time slot in a frame. The time slot includes a synchronization pattern (SYC), a slow channel (SC), a fast channel (FC) containing the speech or data transmitted from the RP 250, a cyclic redundancy code (CRC), and power control channel (PCC) information.

The SYC and SC information comprise a message that the SU 220 uses to synchronize with the RP 250. Synchronization and correlation are performed by the Xilinx chip. The CRC represents data useful for determining errors in transmission.

The channel encoder 244, such as a XC4005-6PQ208C from Xilinx at 2100 Logic Drive, San Jose Calif. 95124-3400, encodes a digital voice signal with the proper digital correlation information. The encoded signal is then modulated using quadrature amplitude modulation (QAM) with a raised-cosine spectral shaping filter. For a more detailed description of a possible SU, reference is made to pending U.S. patent application Ser. No. 08/482,273 filed Jun. 7, 1995.

Figure 1:
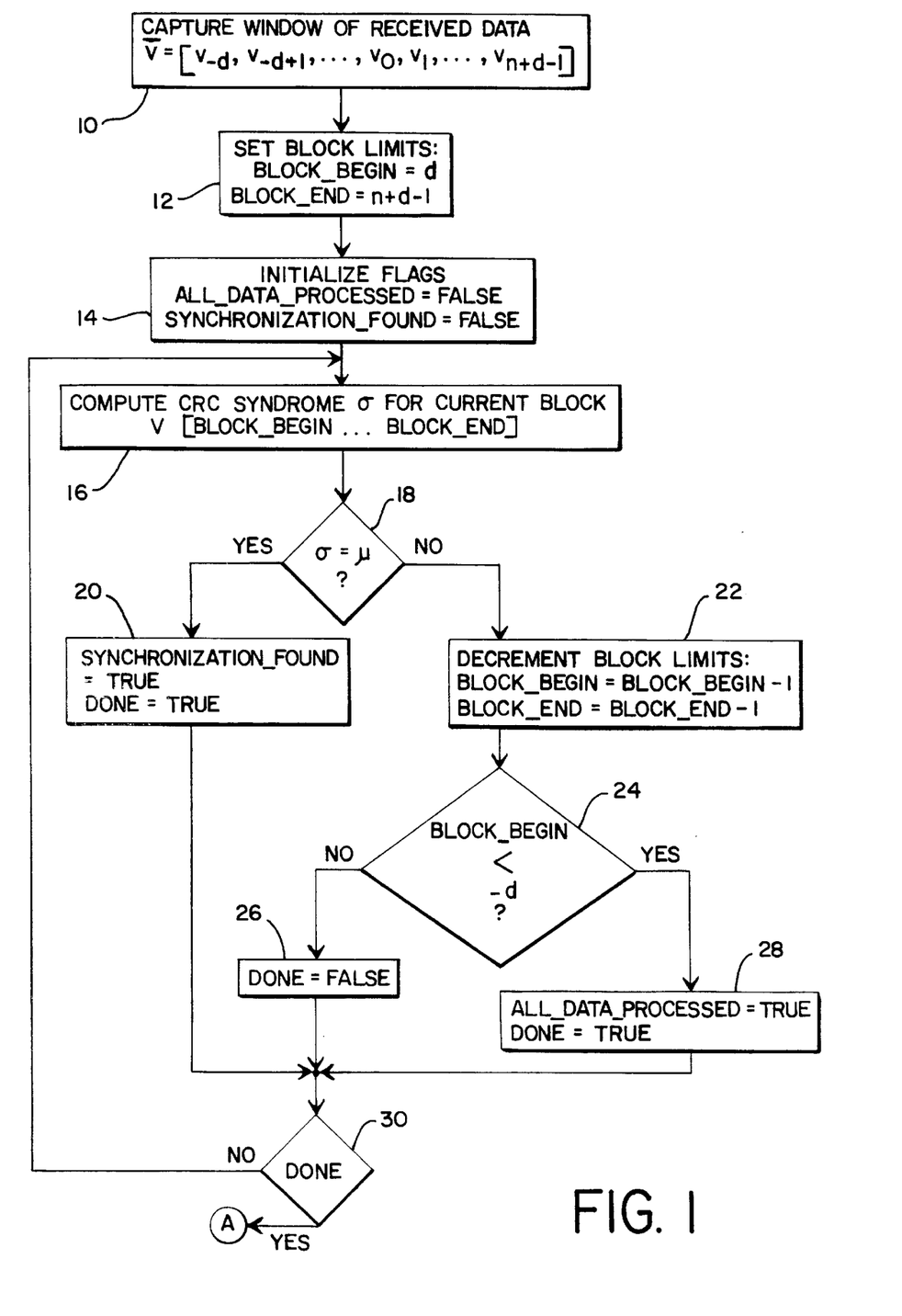
FIG. 1 is a flow diagram of a presently preferred method of synchronizing and error checking received cyclically encoded information.

FIG. 1 illustrates a preferred method for synchronizing and error checking received signals that have been encoded using cyclic redundancy check techniques and marked with a known marker pattern. Preferably, a transmitter marks a transmitted codeword with a marker pattern by inverting certain bits of the codeword (changing a "0" to a "1" bit and vice versa). The marker pattern introduces known errors in the codeword that the receiver can detect and use to correct timing errors.

According to a preferred embodiment, a receiver utilizes the marker information included in the received information bitstream by computing a series of CRC syndromes, one for each different slot framing. The receiver may be an SU 220 or RP 250 as described above. Synchronization is achieved when a predetermined marker syndrome is detected.

In one embodiment, the information is encoded at a transmitting device, such as an SU 220 or RP 250, using a possibly shortened version of a binary cyclic code C with parameters [N,k]. The information is systematically-encoded using the generator polynomial $$g(x)=g_0+g_1x+g_2x^2+\ldots+g_rx^r,$$

where r=N−k is the code redundancy. If the communication system transmits codewords of length n≦N, it may use the shortened code C* with parameters [n,k−N+n] derived from C by using the same generator polynomial and forcing the N−n highest order information bits to be all zero. If n=N, the Code C* is the full length cyclic code C. If $\bar{c}=[c_0,c_1,c_2,\ldots,c_{n-1}]\epsilon C^*$ is a codeword that is communicated between a transmitter and a receiver, synchronization of timing is important to ensure that the received encoded information is usable. Because, a receiver may only be capable of a coarse estimate of bit timing, which may be in error by up to ±d bits, a synchronization process at the receiving end is necessary. The term d represents bit slippage tolerance. In order to assist the timing synchronization process, the transmitter adds a known marker pattern $\overline{m}=[m_0,m_1,m_2, \ldots ,m_{n-1}]$ to the codeword before transmission. Thus, the transmitter transmits the vector $\overline{u}=[u_0,u_1,u_2, \ldots ,u_{n-1}]$, where $u_i=c_i+m_i$ (modulo 2 arithmetic).

As illustrated in FIG. 1, the receiver collects 10 a window of n+2d bits centered around the expected bit timing to compensate for the bit timing uncertainty. $\overline{V}=[v_{-d}, v_{-d+1}, \ldots, v_{-1}, v_0, v_1, v_2, \ldots, v_{n-1}, v_n, \ldots, v_{n+d-1}]$ denotes the entire window of demodulated bits, and $\overline{V}_j=[v_j, v_{j+1}, v_{j+2}, \ldots, v_{j+n-1}]$ denotes the codeword-length segment at bit timing offset j with respect to the expected timing. The bits $v_j$ are indexed in low to high order as in the customary polynomial representation of cyclic codes. Specifically, if $\overline{c}=[c_0,c_1, \ldots ,c_{n-1}]$ is a codeword in C*, its polynomial representation is $c(x)=c_0+c_1 x+c_2 x^2+ \ldots +c_{n-1} x^{n-1}$. Thus, the codeword-length segment $\overline{V}_j$ corresponds to the polynomial $$v_j(x)=v_j+v_{j+1}x+v_{j+2}x^2+ \ldots +v_{j+n-1}x^{n-1}.$$

The bits may or may not be transmitted across the channel in any particular order. There are, however, certain advantages in transmitting the bits in a high to low order as in the WACS/PACS specifications. A presently preferred synchronization method is based on the computation of the syndromes of the received vectors $\overline{V}_j$ with respect to the cyclic code C. If the actual message slippage is s bits, then the timing adjustment method is required to determine j=s and output $\overline{V}_s=\overline{u}$ with high reliability.

As shown in FIG. 1, after collecting the window of demodulated bits, the receiver next sets block limits 12 representing the position of the specific bits of information in the captured window that will first be examined. The receiver initially examines information from block_begin=d to block_end=n+d-1, where n represents the length of a codeword. Additionally, an all_data_processed flag, a synchronization_found flag and a Done flag are initialized 14 as false.

Figure 2:
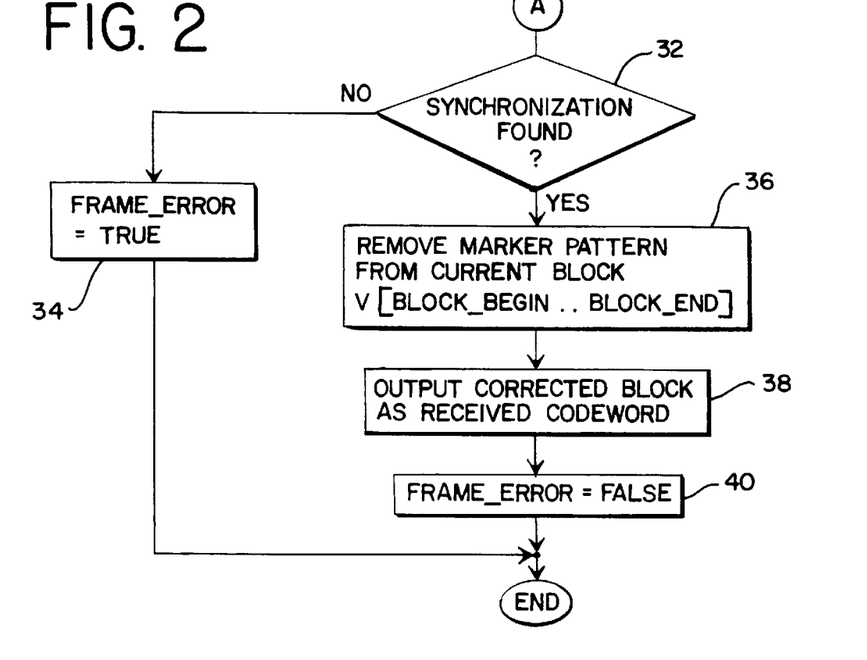
FIG. 2 is a continuation of the flow diagram of FIG. 1.

After capturing the window of information and initializing the flags, the receiver generates 16 a CRC syndrome for the current block of captured bits that are being examined. The syndrome polynomials $\sigma^{(j)}=\sigma\{\overline{V}_j\}$ are defined in the customary manner known to those of ordinary skill in the art using polynomial arithmetic (modulo 2):

$$\sigma\{\overline{V}_j\} = Rem\left\{\frac{V_j(x)}{g(x)}\right\} = \sigma_0^{(j)} + \sigma_1^{(j)}x + \sigma_2^{(j)}x^2 + \ldots + \sigma_{r-1}^{(j)}x^{r-1},$$

where $V_j(x)=v_j+v_{j+1}x+v_{j+2}x^2+ \ldots +v_{j+n-1}x^{n-1}$ is the binary polynomial associated with the received vector $\overline{V}_j$ and Rem $\{\cdot\}$ denotes the remainder produced by the polynomial division. The syndrome polynomial associated with the marker pattern is given by $$\mu(x)=\sigma\{\overline{m}\}=\mu_0+\mu_1 x+\mu_2 x^2+ \ldots +\mu_{r-1}x^{r-1}$$

where $m(x)=m_0+m_1 x+m_2 x^2+ \ldots +m_{n-1}x^{n-1}$ is the polynomial representation of the marker pattern. $\mu(x)=\sigma\{\overline{m}\}$ is referred to as the sync indicator (polynomial or syndrome) or marker syndrome. The generated syndrome is compared 18 to the marker syndrome and, if they match, the synchronization_found and Done flags are set true 20. As shown in FIG. 2, the receiver then removes the marker pattern 36 from the block of information currently being examined, outputs 38 the corrected block as the proper codeword for further processing, and sets 40 a Frame_error flag false.

Referring again to FIG. 1, if the marker syndrome and generated syndrome do not match, then the block_begin and block_end parameters are decremented 22 one bit to shift or rotate the block of information being examined from the window of received data. The receiver next checks 24 to see if the value of block_begin is less than −d (indicating that the entire window $\overline{V}$ of demodulated bits has been tested). Done is set 26 false if fewer than 2d+1 cycles have been performed and the steps of generating 16 a CRC syndrome and comparing 18 the generated and marker syndromes are repeated on the incremented block of information.

When no match is found between the generated and marker syndromes for all the 2d+1 generated syndromes, the block_begin value will be less than −d and so the all_data_processed and Done flags are set 28 true. The synchronization_found flag will be detected 32 (FIG. 2) as false and a frame_error flag will be set 34 true indicating that the information in the captured window contains an error.

FIG. 1 shows an initial step in which all n+2d data bits are captured followed by the syndrome computation and processing steps. While this description describes the method in a general form in which no assumptions are made regarding the manner or order in which the data bits are transmitted across the channel or demodulated by the receiver, the basic method of synchronization does not depend on the completion of data collection before syndrome processing. Data bits need not be collected until needed by the syndrome calculation steps. In particular, if the data bits are transmitted and received across the channel from high to low order, then the bits can be collected and processed serially as they are output by the receiver demodulator. In a preferred embodiment, in which all bits are collected first before processing, the evaluation of syndromes may occur in any order.

In one preferred embodiment, the $\sigma^{(j)}$ may be computed independently (in parallel) by replicating the syndrome calculator function in hardware, once per tentative slot framing, such that all 2d+1 syndromes may be found at one time. In another preferred embodiment, a more compact implementation is possible based on a recursive method of computing the syndromes to be derived below. First, note that $$V_j(x) = v_j + v_{j+1}x + v_{j+2}x^2 + \ldots + v_{j+n-1}x^{n-1} = x \cdot (V_{j+1}(x) - v_{j+n}x^{n-1}) + v_j.$$

Thus, $$\sigma^{(j)} = Rem\left\{\frac{x \cdot V_{j+1}(x) + v_j}{g(x)}\right\} - v_{j+n} \cdot Rem\left\{\frac{x^n}{g(n)}\right\}.$$

The operation Rem$\{\cdot/g(x)\}$ is preferably implemented in hardware by means of a linear feed-back shift register with connections wired according to the coefficients of g(x). From this perspective, the two terms in the equation for $\sigma^{(j)}$ are easy to interpret. The first term corresponds to loading the "divide-by-g(x)" shift register with $\sigma^{(j+1)}$ and clocking it once with input $v_j$. One may think of this term as arising from the continuous operation of the "divide-by-g(x)" circuit as the vector $\overline{V}$ is fed from right to left (i.e., starting with $v_{n+d-1}$) into the shift register. The second term may then be thought of as a correction factor dependent only on $v_{j+n}$, since the polynomial h(x)=Rem $\{x^n/g(x)\}=h_0+h_1 x+h_2 x^2+ \ldots +h_r x^{r-1}$ is a constant determined by choice of g(x).

Figure 3:
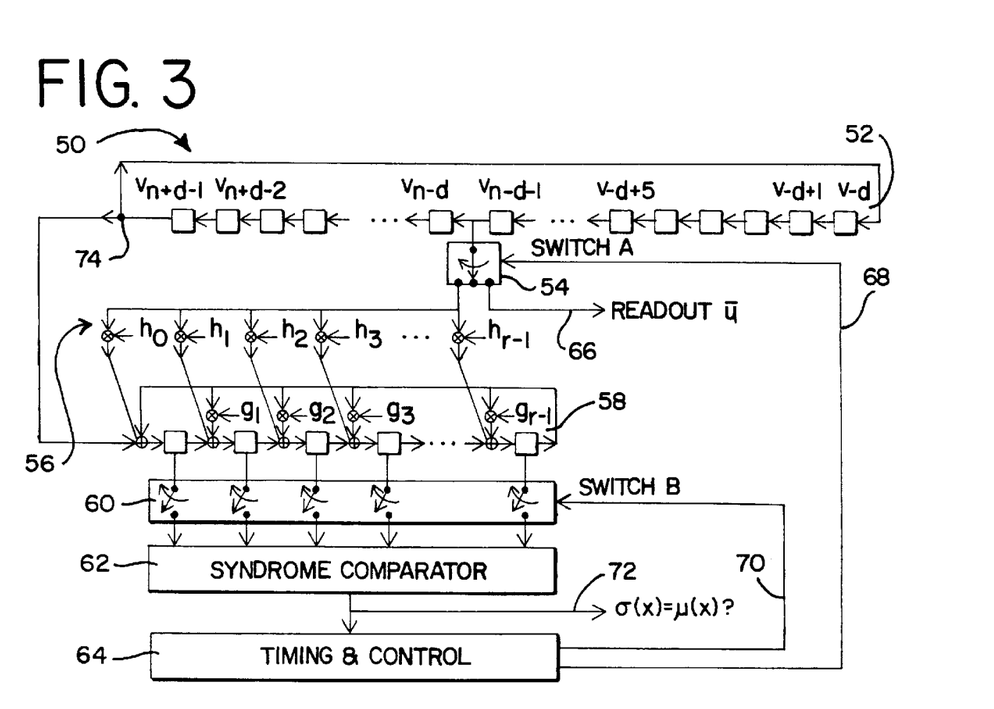
FIG. 3 is a block diagram of a receiver configured to implement the preferred method of the present invention.

The recursive method of syndrome calculation leads to the sequential shift register implementation of FIG. 3.

Operation of the circuit consists of three phases. First, an initial processing phase to generate the first syndrome $\sigma^{(d)}$. Second, steady-state processing phase to compute $\sigma^{(j)}$ from $\sigma^{(j+1)}$. Finally, a post-processing phase to read out, if one is found, the synchronized bit stream.

As best shown in FIG. 3 the receiver 50 includes a first sequential shift register 52 connected to a first switch 54 and a second sequential shift register 58. The first switch 54 is also connected to syndrome correction lines 56 and an output line 66. The first switch is controlled via a first control line 68. The correction lines 56 connect to the second shift register (the "divide-by-g(x)" register) 58. Preferably, the syndrome correction lines are wired or configured based on the coefficients of the polynomial $$h(x) = Rem\left\{\frac{x^n}{g(x)}\right\}.$$

The second shift register, which preferably contains the most recently generated syndrome value, is in communication with a second switch 60. The second switch is clocked via a second control line 70. The second shift register 58 communicates with a syndrome comparator 62 via the second switch 60. The syndrome comparator 62 preferably contains the predetermined marker syndrome. The syndrome comparator 62 communicates directly with a timing and control block 64 and outputs information on whether a syndrome match has been detected on a output flag line 72. The timing and control device 64 monitors the output of the comparator 62 and controls the switches 54, 60 via the control lines 68, 70.

Figure 4:
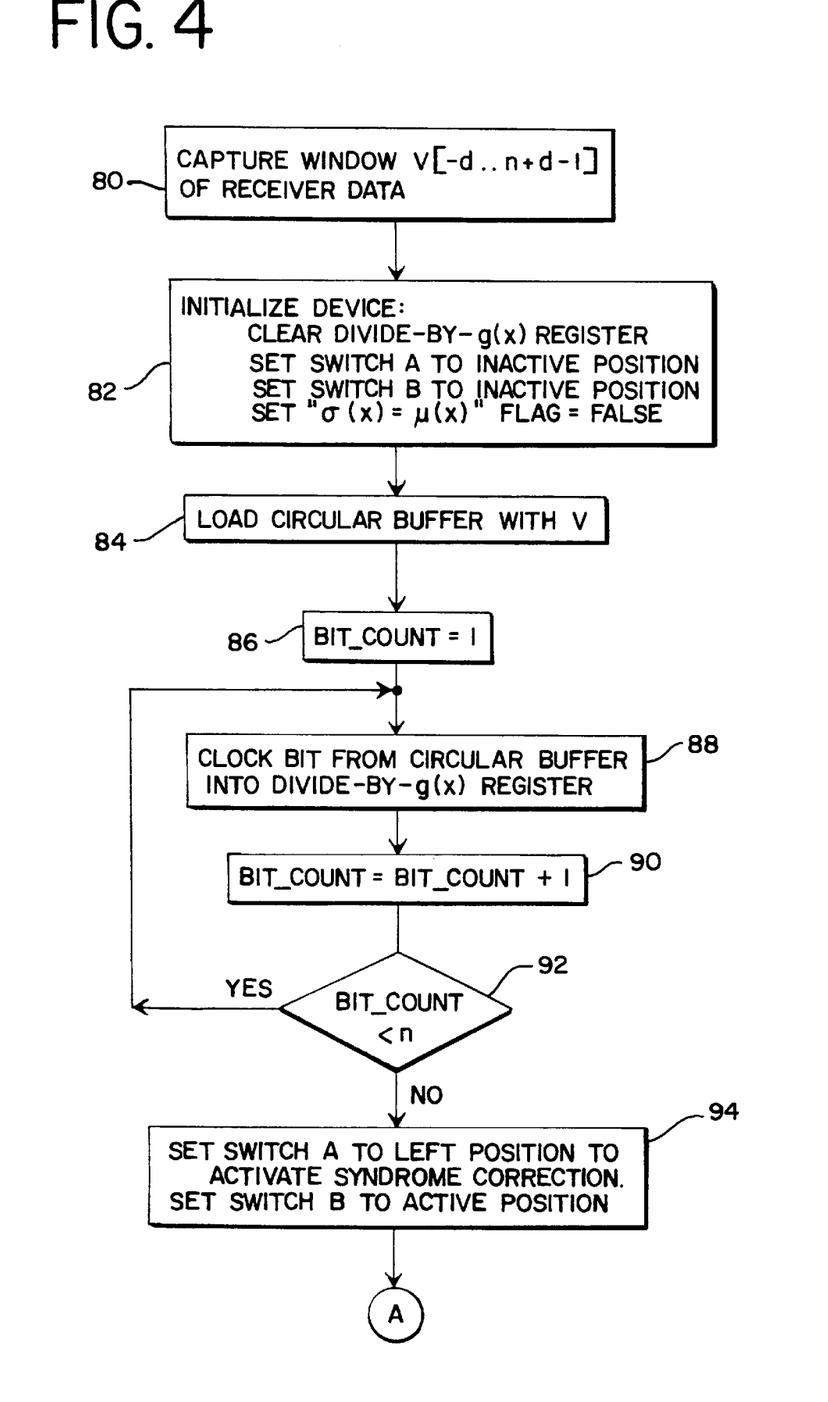
FIG. 4 is a flow diagram of a preferred method of synchronizing and error checking received cyclically encoded data for use with the receiver of FIG. 3.
Figure 5:
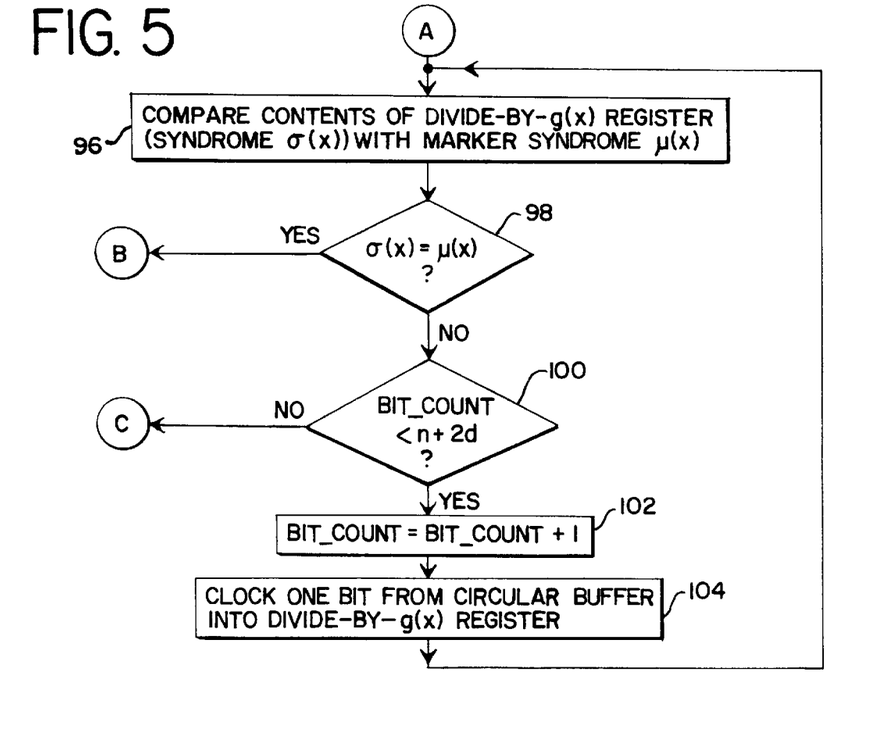
FIG. 5 is a continuation of the flow diagram of FIG. 4.
Figure 6:
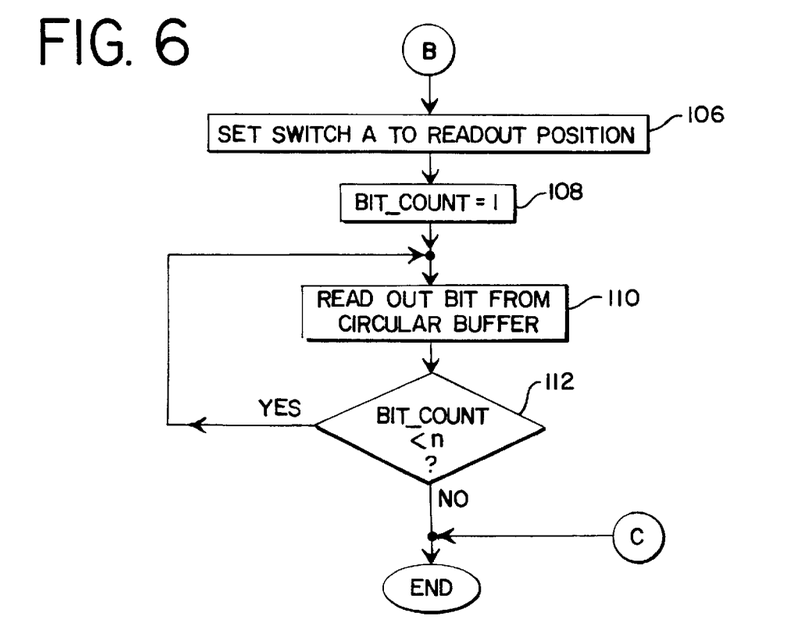
FIG. 6 is a continuation of the flow diagram of FIG. 5.

A preferred method for operating the receiver is illustrated in FIGS. 4–6. A window of captured data is acquired 80 from the received bitstream. The receiver 50 initializes 82 the flags and switches and loads 84 the first shift register 52, which may be a circular buffer or other type of shift register, with the captured window of information so that the shift register 52 contains $\overline{V}$, initially loaded as shown in FIG. 3. The switches 54, 60 are initially in the off positions as shown. The initial processing period extends over the next n clocks, during which the bits of $\overline{V}_d$ are fed 88 into the "divide-by-g(x)" shift register 58 (FIG. 3), after initializing 86 a counter. With each bit that is shifted into the register 58, the counter is incremented 90. This process continues until 92 one codeword length (n bits) number of bits has been loaded into the register 58.

At this point, $\sigma^{(d)}$ has been computed in the "divide-by-g(x)" shift register. The second switch 60 is then enabled to read $\sigma^{(d)}$ into the syndrome comparator 62. If $\sigma^{(d)} \neq \mu(x)$, the first switch 54 is thrown to the first ON position in order to provide the correction bits for steady-state processing to the divide-by-g(x) syndrome register 58 via the syndrome correction lines 56.

Steady-state processing, as shown in FIG. 5, extends over a time period of at most 2d clocks, during which the remaining syndromes are successively calculated and put through the comparator. Steady-state consists of comparing 96 the generated and marker syndromes in the comparator 62, determining if there is a match 98, and incrementing 102 a counter if the counter indicates 100 that the 2d+1 syndrome calculations have not yet been performed.

During steady-state processing, each clocking of the shift registers results in a new $\sigma^{(j)}$. As soon as the syndrome comparator finds a syndrome matching $\mu(x)$, steady-state processing is completed. Switch A is then thrown to the readout position in order to clock out the n bits of $\overline{V}_j$, as the output $\overline{u}$. Abnormal termination, when all 2d+1 syndromes fail to match $\mu(x)$, is indicated by the flag "$\sigma(j)=\mu(x)$?" being set false.

If, in certain embodiments such as PACS, the bits are transmitted and received across the channel from high to low order (i.e. $v_{n+d-1}$ is the first such transmitted bit), the bits may be processed in a serial fashion as they become available from the demodulator. In particular, the received data bits may be serially fed into both shift registers 52 and 58 at an insertion point 74 in FIG. 3. When possible, pipelining the data bit collection and syndrome processing in this manner further reduces processing delay.

In a preferred embodiment, the embodiment described above is used in a wireless personal communications system such as PACS. The PACS system uses the [N=105,k=90] cyclic code generated by the polynomial $g(x)=1+x^6+x^8+x^9+x^{11}+x^{12}+x^{13}+x^{15}$. The marker pattern is $m(x)=1+x^{104}$ (invert the first and last bits). When the channel is error-free, the new CRC-based synchronization method is capable of correcting slippage up to ±d bits where $$d \leq \left\lfloor \frac{r-2}{2} \right\rfloor$$

and r is the redundancy of the binary cyclic code C[N,k]. For PACS, r=15 and d≤6. The cyclic code used by PACS is a full-length cyclic code.

Referring again to FIGS. 7–10, the receiver 50 (FIG. 3) may be implemented in an SU 220 or an RP 250. In particular, the channel decoder 168, 235 in the SU and RP may perform the method of the present invention. As described above, a Xilinx XC4005 may be configured to perform the necessary tasks of synchronization and error detection.

From the foregoing, an improved method and device for synchronizing received transmissions in a wireless communication system has been disclosed. By computing successive syndromes via a single polynomial-division shift register, the new method can be implemented by a device of lesser complexity and comparable efficacy, when compared with existing methods and devices, without introducing significant processing delay or excluding use of a shortened cyclic code for error detection. The technique is also of potential use in new mobile radio product developments such as an advanced version of Fixed Wireless. As has been described, a method has been shown consisting of computing up to 2d+1 syndromes $\{\sigma^{(j)}\}^d_{j=-d}$ and determining which one of them, if any, is equal to the marker syndrome. Note that, when the channel is error-free, $$\sigma^{(s)}=\sigma\{\overline{V}_s\}=\sigma\{\overline{c}+\overline{m}\}=\sigma\{\overline{c}\}+\sigma\{\overline{m}\}=\sigma\{\overline{m}\}.$$

Hence, the method will be successful provided that $-d \leq s \leq d$ and that the marker pattern $\overline{m}$ is properly designed to avoid ambiguities (i.e., some other allowed delay produces a syndrome polynomial equal to $\sigma\{\overline{m}\}$). The method and apparatus described above is compatible with the use of shortened cyclic codes for error detection as well as full-length cyclic codes such as stipulated in WACS/PACS specifications and thereby allows flexibility to the system designer in structuring a TDMA timeslot.

It is intended that the foregoing detailed description be regarded as illustrative rather than limiting, and that it be understood that the following claims, including all equivalents, are intended to define the scope of this invention.

What is claimed is:

1. A method of synchronizing cyclically coded information transmitted in a wireless communications system comprising the steps of:

electing a predetermined number of bits of cyclically coded information received from a transmitted signal;

generating a first syndrome which is simultaneously indicative of both bit synchronization and bit error;

determining if the bits of information are synchronized and error free by comparing the first syndrome with a marker syndrome to determine if they match, wherein the bits of information are synchronized and error free if the first and marker syndromes match;

rotating the predetermined number of bits in a shift register by one bit;

(a) generating a new syndrome for the rotated bits, the new syndrome being simultaneously indicative of both bit synchronization and bit error;

(b) comparing the new syndrome value with the marker syndrome; and repeating the steps (a) and (b) until the new syndrome matches the marker syndrome or the predetermined number of bits have been rotated a predetermined number of one bit rotations.

2. The method of claim 1 wherein the predetermined number of one bit rotations is equal to 2d rotations wherein d represents bit slippage tolerance.

3. A method of synchronizing and detecting errors in received transmissions of cyclically coded information comprising the steps of:

loading a predetermined number of bits of the received transmission into a shift register;

generating a first syndrome, $\sigma^{(d)}$, in a divide-by-g (x) shift register, where $$\sigma\{\overline{V_j}\} = Rem\left\{\frac{V_j(x)}{g(x)}\right\} = \sigma_0^{(j)} + \sigma_1^{(j)}x + \sigma_2^{(j)}x^2 + \ldots + \sigma_{r-1}^{(j)}x^{r-1};$$

comparing $\sigma^{(d)}$ to a marker syndrome, $\mu(x)$, in a syndrome comparator;

providing correction bits via syndrome correction lines to the divide-by-g (x) register if the marker syndrome and the first syndrome do not match;

shifting in the next received bit;

generating a new syndrome, $\sigma^{(d)}$;

comparing the new syndrome to the marker syndrome; and repeating the steps of shifting, generating and comparing until the received bits have been shifted a predetermined number of times.

4. The method of claim 3 wherein the predetermined number of times is a bit slippage tolerance multiplied by two.

5. The method of claim 3 further comprising the steps of shifting in the next received bit, generating a new syndrome, $\sigma^{(j)}$, comparing the new syndrome to the marker syndrome and repeating the steps of shifting, generating and comparing until the marker syndrome and the new syndrome match.

6. The method of claim 3 further comprising the steps of:

rotating the predetermined number of bits in the shift register;

generating a new syndrome from the rotated bits;

comparing the new syndrome generated from the rotated bits to the marker syndrome; and transferring a stream of bits from the predetermined number of bits in the shift register if the new syndrome generated from the rotated bits matches the marker syndrome.

7. The method of claim 6 wherein the transferred stream of bits is n bits long, and wherein n represents a codeword length.

8. The method of claim 3 further comprising the steps of:

shifting in the predetermined number of bits in the shift register;

generating a syndrome polynomial from the shifted bits;

comparing the syndrome polynomial generated from the shifted bits to the marker syndrome; and transferring a stream of bits from the predetermined number of bits in the shift register if the syndrome polynomial generated from the shifted bits matches the marker pattern.

9. A method of synchronizing cyclically coded information transmitted in a wireless communications system comprising the steps of:

selecting a predetermined number of bits of cyclically coded information received from a transmitted signal;

generating a first syndrome which is simultaneously indicative of both bit synchronization and bit error;

determining if the bits of information are synchronized and error free by comparing the first syndrome with a marker syndrome to determine if they match, wherein the bits of information are synchronized and error free if the first and marker syndromes match;

shifting in a new received bit into a shift register;

(a) generating a new syndrome for the shifted bits, the new syndrome being simultaneously indicative of both bit synchronization and bit error;

(b) comparing the new syndrome with the marker syndrome; and repeating the steps (a) and (b) until the new syndrome matches the marker syndrome or a predetermined number of new bits have been shifted into the shift register.

10. The method of claim 9 wherein the predetermined number of new bits shifted into the shift register is equal to 2d wherein d represents bit slippage tolerance.

* * * * *